United States Patent
Kimura

(10) Patent No.: US 10,221,935 B2
(45) Date of Patent: Mar. 5, 2019

(54) SPEED REDUCTION APPARATUS

(71) Applicant: Sumitomo Heavy Industries, Ltd., Tokyo (JP)

(72) Inventor: Kazuhiro Kimura, Okayama (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 387 days.

(21) Appl. No.: 15/087,676

(22) Filed: Mar. 31, 2016

(65) Prior Publication Data
US 2016/0290478 A1 Oct. 6, 2016

(30) Foreign Application Priority Data
Mar. 31, 2015 (JP) .................... 2015-072676

(51) Int. Cl.
*F16H 57/04* (2010.01)
*F04D 19/00* (2006.01)
*F04D 29/54* (2006.01)

(52) U.S. Cl.
CPC ....... *F16H 57/0416* (2013.01); *F04D 19/002* (2013.01); *F04D 29/547* (2013.01)

(58) Field of Classification Search
CPC .................................................. F16H 57/0416
See application file for complete search history.

(56) References Cited

U.S. PATENT DOCUMENTS

| | | | |
|---|---|---|---|
| 4,872,502 A | 10/1989 | Holzman | |
| 7,615,897 B2 | 11/2009 | Kinoshita | |
| 9,366,332 B2* | 6/2016 | Hayashi | F16H 57/0416 |
| 2012/0031214 A1 | 2/2012 | Strauss et al. | |
| 2014/0338495 A1* | 11/2014 | Hayashi | F16H 57/0416 74/606 A |
| 2016/0053775 A1 | 2/2016 | Volker et al. | |

FOREIGN PATENT DOCUMENTS

| | | |
|---|---|---|
| CN | 104185750 A | 12/2014 |
| GB | 2 282 206 A | 3/1995 |
| JP | H05-004763 U | 1/1993 |
| JP | H11-004559 A | 1/1999 |
| JP | 2001-238404 A | 8/2001 |
| JP | 2005-278288 A | 10/2005 |
| JP | 2013-204814 A | 10/2013 |
| WO | WO 2013146258 A1 * | 10/2013 ......... F16H 57/0416 |
| WO | WO-2014/154316 A1 | 10/2014 |

OTHER PUBLICATIONS

Office Action issued in Chinese Application No. 201610130768.X, dated Jan. 4, 2018.
Office Action issued in Chinese Application No. 201610130768.X, dated Sep. 11, 2018.

* cited by examiner

*Primary Examiner* — Justin D Seabe
*Assistant Examiner* — Juan G Flores
(74) *Attorney, Agent, or Firm* — Michael Best & Friedrich LLP

(57) ABSTRACT

Disclosed is a speed reduction apparatus including: a casing that accommodates a speed reduction mechanism; an input shaft including a protruding portion protruding from the casing to the outside; a fan provided on the protruding portion of the input shaft; and a fan hood that covers the fan. The fan hood includes a cylindrical portion, and a trumpet-like portion that is connected to the cylindrical portion, and includes an inner surface inclined to be separated away from the input shaft toward a load side. A flow straightening fin is provided on an inner surface of the trumpet-like portion.

13 Claims, 4 Drawing Sheets

SPEED REDUCTION APPARATUS

RELATED APPLICATIONS

Priority is claimed to Japanese Patent Application No. 2015-072676, filed Mar. 31, 2015, the entire content of which is incorporated herein by reference.

BACKGROUND

Technical Field

Certain embodiments of the present invention relate to a speed reduction apparatus.

Description of Related Art

Configuration components such as gears inside a speed reduction apparatus are rotated at high speeds. Particularly, since the rotational speed of an input shaft is higher than that of an output shaft, heat generation of the input shaft becomes a problem. In a case where the temperature of the speed reduction apparatus becomes high, a problem occurs in that damage to bearings may occur early due to aging of a seal or oil, or oil film reduction. For this reason, a structure, in which a cooling fan is provided on the input shaft of the speed reduction apparatus, is known.

The related art discloses a structure of a speed reduction apparatus which includes a casing accommodating a speed reduction mechanism; an input shaft including a protruding portion protruding from the casing to the outside; a fan provided on the protruding portion of the input shaft; and a fan hood covering the fan, and in which the fan hood includes an extending portion covering a side surface of the casing, and flow straightening fins are provided on an inner surface of the extending portion.

SUMMARY

According to an embodiment of the present invention, there is provided a speed reduction apparatus including: a casing that accommodates a speed reduction mechanism; an input shaft including a protruding portion protruding from the casing to the outside; a fan provided on the protruding portion of the input shaft; and a fan hood that covers the fan. The fan hood includes a cylindrical portion, and a trumpet-like portion that is connected to the cylindrical portion, and includes an inner surface inclined to be separated away from the input shaft toward a load side. A flow straightening fin is provided on an inner surface of the trumpet-like portion.

DETAILED DESCRIPTION

In the related art, a flow straightening effect of air suctioned into the fan hood by the fan is not sufficient, and it cannot necessarily be said that satisfactory cooling performance is obtained.

It is desirable to provide technology of efficiently cooling an input shaft side of a speed reduction apparatus including a fan on the input shaft side, and a fan hood covering the fan.

According to the embodiment, the flow of air suctioned into the fan hood by the fan is straightened by a flow straightening fin provided on an inner surface of a trumpet-like portion, and air flowing out from the fan hood flows along the vicinity of an exterior surface of a casing. As a result, cooling effects are improved.

An arbitrary combination of configuration elements, or replacement of the configuration elements or configuration of the embodiment of the present invention in a method, an apparatus, or a system is effective as an embodiment of the present invention.

Figure 1:
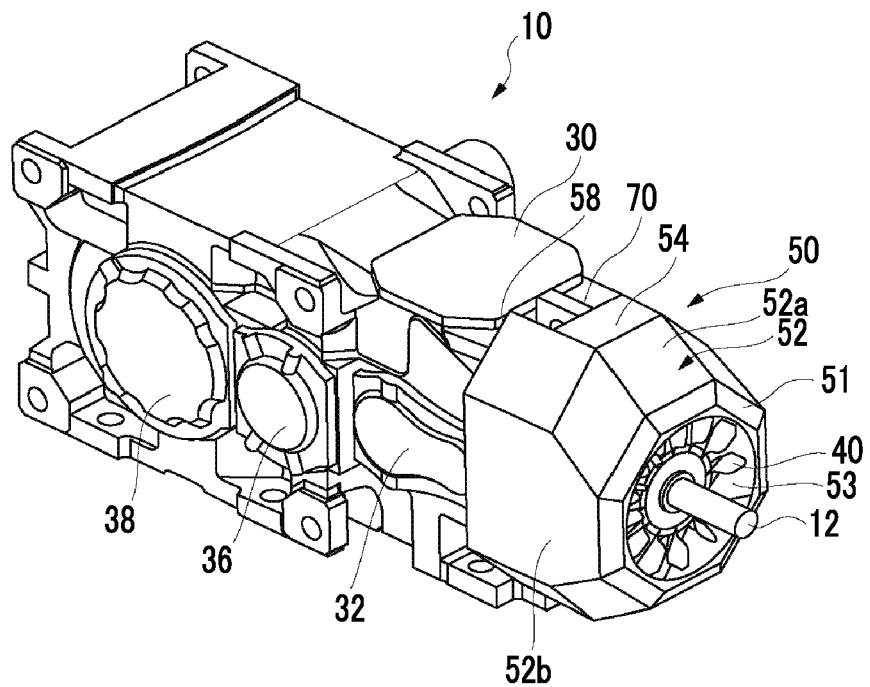
FIG. 1 is a top perspective view of a speed reduction apparatus according to an embodiment of the present invention.
Figure 2:
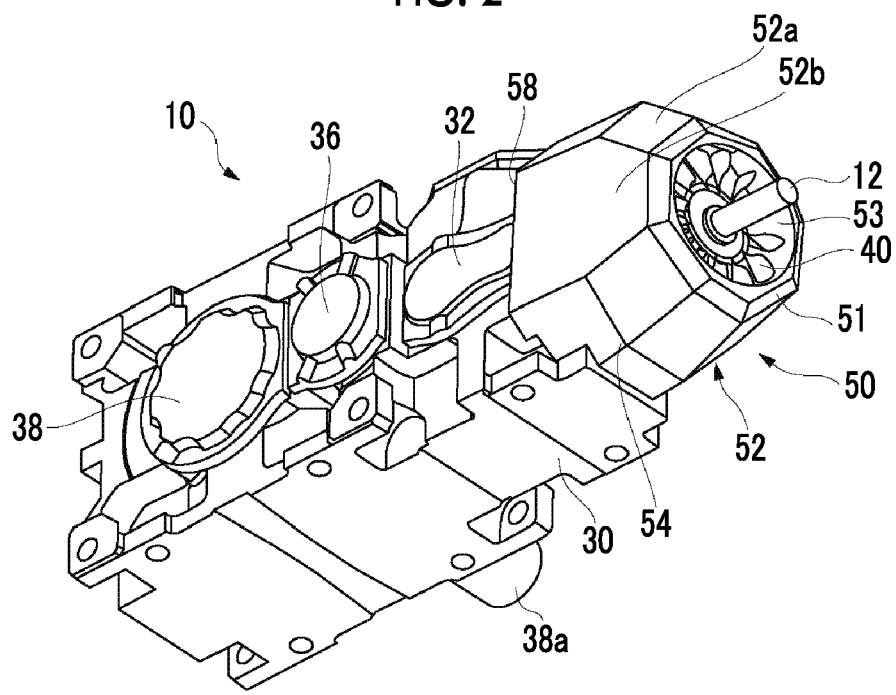
FIG. 2 is a bottom perspective view of the speed reduction apparatus in FIG. 1.

FIG. 1 is a perspective view of a speed reduction apparatus 10 according to an embodiment of the present invention when the speed reduction apparatus 10 is diagonally seen from an upper left side. FIG. 2 is a perspective view of the speed reduction apparatus 10 according to the embodiment of the present invention when the speed reduction apparatus 10 is diagonally seen from a lower left side.

The speed reduction apparatus 10 includes a speed reduction mechanism (not illustrated) formed of a perpendicular-shaft three-stage speed reducer using a bevel gear. The speed reduction mechanism includes an input shaft (only a protruding portion 12 is illustrated); a first intermediate shaft 32 perpendicular to the input shaft; a second intermediate shaft 36 meshing with the first intermediate shaft 32 via a helical gear; and an output shaft 38 meshing with the second intermediate shaft 36 via a helical gear.

The input shaft, the first intermediate shaft 32, and the second intermediate shaft 36 of the speed reduction mechanism are accommodated inside a casing 30. The output shaft 38 is accommodated inside the casing 30, and a portion of the output shaft 38 protrudes from the casing 30. Each of the input shaft, the first intermediate shaft 32, the second intermediate shaft 36, and the output shaft 38 is supported by the casing 30 via bearings (not illustrated). An inner space bounded by the casing 30 is filled with lubricant oil. The speed reduction apparatus 10 is used in state where a lower surface of the casing 30 is mounted on a floor or the like.

A well-known speed reduction mechanism is used as the speed reduction mechanism inside such a speed reduction apparatus, and thus, a detailed description thereof will be omitted in this application.

The protruding portion 12 is provided at an end of the input shaft, and protrudes from the casing 30 to the outside. The protruding portion 12 of the input shaft is coupled to an output shaft of a driving motor (not illustrated) by using a key, a coupling, or the like. A protruding portion 38a protruding from the casing 30 is provided at an end of the output shaft 38. An input shaft of a driven machine (not illustrated) is coupled to the protruding portion 38a by using a key, a coupling, or the like. In the following description, a non-load side refers to a side on which the input shaft of the speed reduction apparatus 10 is disposed, and a load side refers to a side on which the output shaft 38 is disposed.

A cooling fan 40 is attached to the protruding portion 12 of the input shaft. A radial fan is preferably used as the fan 40 so as to feed suctioned air to the radial outside no matter what direction the input shaft is rotated. In a case where the input shaft is rotated in only one direction, an axial fan may be used as the fan 40.

A fan hood 50 is attached to a non-load side end portion of the casing 30, and covers the fan 40. The fan hood 50 is formed into an overall substantially bowl shape.

The fan hood 50 includes a cylindrical portion 54 having an inner surface extending in parallel with the input shaft, and a trumpet-like portion 52 that is connected to the cylindrical portion 54, and includes an inner surface inclined to be separated away from the input shaft toward the load side. In the embodiment, the cylindrical portion 54 is formed by eight surfaces, and both of inner and outer surfaces of the cylindrical portion 54 are parallel to the input shaft. An inclined portion 51 inclined toward the protruding portion 12 of the input shaft is connected to the non-load side of the trumpet-like portion 52. A non-load side opening portion 53 of the fan hood 50 is formed on the inner diameter side of the inclined portion 51. A load side opening portion 58 is formed on the load side of the fan hood 50. In the embodiment, a gap of approximately 20 mm to approximately 50 mm is formed between the load side opening portion 58 and an external surface of the casing 30. When the fan 40 is rotated, air is suctioned into the fan hood 50 through the non-load side opening portion 53 of the fan hood 50, and airstreams are blown to the load side of the speed reduction apparatus 10 from the load side opening portion 58.

More specifically, the trumpet-like portion 52 of the fan hood 50 is configured to include a diameter increasing portion 52a having an inner surface inclined to be separated away from the input shaft toward the load side, and a flat portion 52b having an inner surface parallel to the input shaft. A pair of the diameter increasing portions 52a is respectively provided on the upper and lower surface sides of the casing 30. A pair of the right and left flat portions 52b is provided to connect the diameter increasing portions 52a on the upper surface side to the diameter increasing portion 52a on the lower surface side. The flat portion 52b forms a continuous surface which is continuous with a side surface of the cylindrical portion 54. As a result, in such a structure, the axis perpendicular section of the trumpet-like portion 52 has an octagonal shape.

It is possible to reduce the length of time that airstreams generated by the fan 40 spend at the four corners of the fan hood, and to blow parallel airstreams along the external surface of the casing 30 from the load side opening portion 58 of the fan hood 50 by forming the section of the trumpet-like portion 52 into an octagonal shape close to a circular shape, compared to a case where the trumpet-like portion has a rectangular section.

A cutout 70 may be formed in an upper surface of the cylindrical portion 54 such that a hanging tool (not illustrated) attached to the casing 30 is exposed through the cutout 70 in a case where the speed reduction apparatus 10 is hung. In a case where a sufficient axial length of the cylindrical portion 54 is ensured, the formation of the cutout 70 has almost no impact on the formation of parallel airstreams on the upper surface side.

Figure 3:
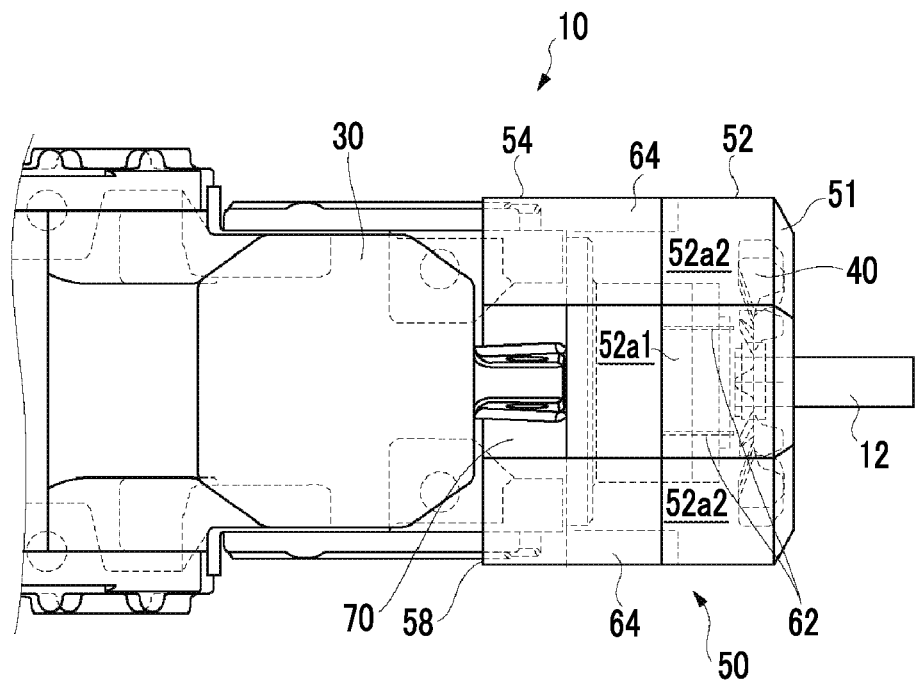
FIG. 3 is a top view illustrating an input shaft side of the speed reduction apparatus in FIG. 1.
Figure 4:
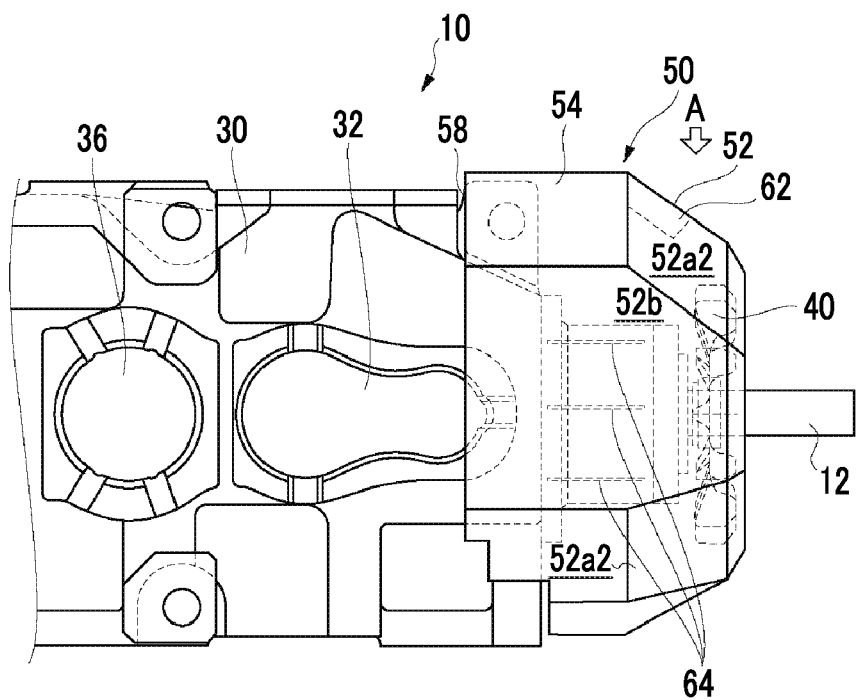
FIG. 4 is a front view illustrating the input shaft side of the speed reduction apparatus in FIG. 1.

FIGS. 3 and 4, respectively, are a top view and a front view illustrating the non-load side of the speed reduction apparatus 10. In FIGS. 3 and 4, a structure hidden by the fan hood 50 is illustrated by the dotted line.

As illustrated in the drawings, the diameter increasing portion 52a of the trumpet-like portion 52 includes a central diameter increasing portion 52a1, and right and left diameter increasing portions 52a2 which are respectively positioned on the right and left sides of the central diameter increasing portion 52a1. A flow straightening fin 62 is provided on an inner surface of the central diameter increasing portion 52a1 on the upper surface side. In the embodiment, two flow straightening fins 62 are provided; however, different numbers of flow straightening fins 62 may be provided. Flow straightening fins are not provided on an inner surface of each of the right and left diameter increasing portions 52a2 on the upper surface side. Flow straightening fins are also not provided on an inner surface of any one of the central diameter increasing portion 52a1, and the right and left diameter increasing portion 52a2 on the lower surface side.

The flow of airstreams generated by the fan 40 is straightened, and parallel airstreams are formed along the exterior surface of the casing 30 by providing the flow straightening fins on the inner surface of the fan hood 50.

A flow straightening fin (second flow straightening fin) 64 may also be provided on an inner surface of the cylindrical portion 54 connected to the flat portion 52b of the trumpet-like portion 52, along with providing the flow straightening fins 62 on the inner surface of the diameter increasing portion 52a of the trumpet-like portion 52. In the embodiment, three flow straightening fins 64 are provided on each of right and left side surfaces (surfaces respectively connected to the flat portions 52b of the trumpet-like portion 52) of the cylindrical portion 54; however, different numbers of flow straightening fins 64 may be provided. As illustrated in FIG. 4, the flow straightening fins 62 of the trumpet-like portion 52 and the flow straightening fins 64 of the cylindrical portion 54 are preferably disposed in such a way that at least portions of the flow straightening fins 62 and the flow straightening fins 64 overlap each other in a circumferential direction. That is, the flow straightening fins 64 are preferably disposed across both the cylindrical portion 54 and the flat portion 52b of the trumpet-like portion 52. In this way, flow straightening effects are further improved.

The flow straightening fins 62 are preferably disposed in such a way that the flow straightening fins 62 and the fan 40 do not overlap each other when seen in a radial direction (in the direction of arrow A in FIG. 4). In this way, even in a case where the attached position of the fan hood 50 is slightly offset from a required position, collision between blades of the fan 40 and the flow straightening fins 62 can be avoided.

Hereinafter, the operation of the speed reduction apparatus 10 will be described.

When a motor shaft of the motor (not illustrated) rotates, the input shaft coupled to the motor shaft is rotated. When the input shaft is rotated, the first intermediate shaft 32, the second intermediate shaft 36, and the output shaft 38 are rotated by meshing of the gears while the speed is reduced. The rotation of these shafts is transmitted to a non-driven machine (not illustrated).

The fan 40 attached to the protruding portion 12 of the input shaft is rotated, and air is suctioned into the fan hood 50 through the non-load side opening portion 53 of the fan hood 50. The suctioned air is fed as airstreams to the radial outside by the rotation of the fan 40. The direction of the fed airstreams is changed by the trumpet-like portion 52 and the cylindrical portion 54 of the fan hood 50. The flow of the airstreams is straightened by the flow straightening fins 62 provided on the inner surfaces of the trumpet-like portion 52 and the flow straightening fins 64 provided on the inner surfaces of the cylindrical portion 54. The airstreams flowing out from the load side opening portion 58 of the fan hood 50 are directed to flow substantially parallel with the exterior surface of the casing 30. Accordingly, cooling effects for the vicinity of the casing 30 accommodating the input shaft, the first intermediate shaft 32, and the bevel gear meshing the input shaft with the first intermediate shaft 32, which have the highest rotational speed and a high thermal load, are particularly improved. Cooling effects for the second intermediate shaft 36 are also improved by parallel airstreams.

Figure 5:
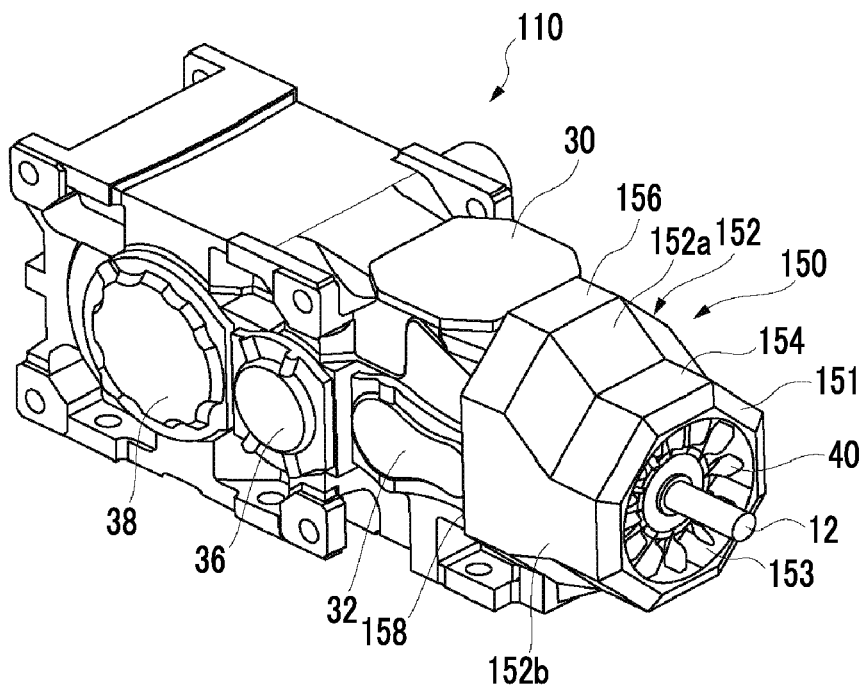
FIG. 5 is a top perspective view of a speed reduction apparatus according to another embodiment of the present invention.
Figure 6:
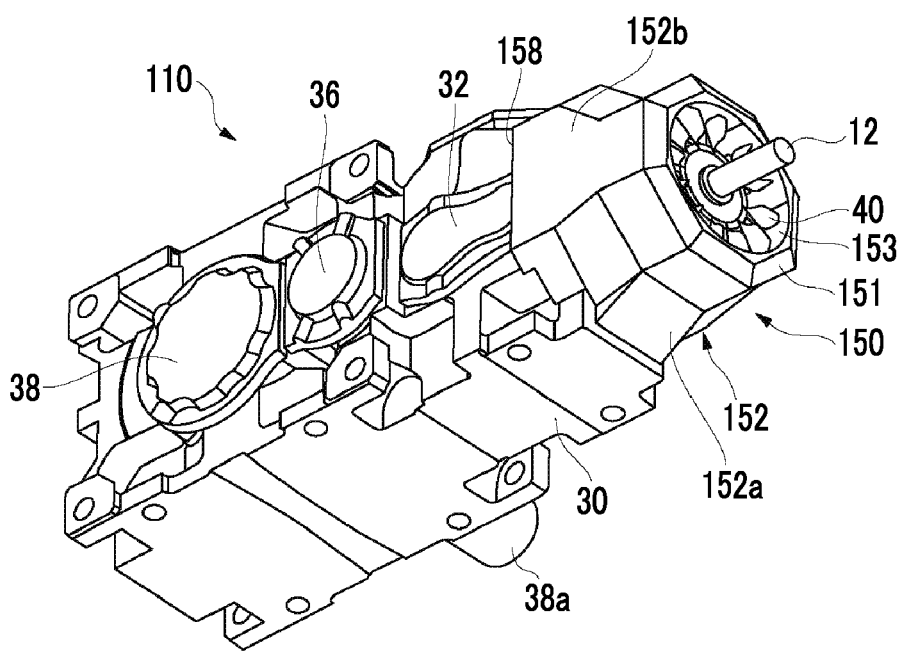
FIG. 6 is a bottom perspective view of the speed reduction apparatus according to the other embodiment of the present invention in FIG. 5.

FIG. 5 is a perspective view when a speed reduction apparatus 110 according to another embodiment of the present invention is diagonally seen from the upper left side. FIG. 6 is a perspective view when the speed reduction apparatus 110 according to the other embodiment of the present invention is diagonally seen from the lower left side. The same reference signs will be assigned to the same configuration elements of the speed reduction apparatus 110 as those of the speed reduction apparatus 10 illustrated in FIGS. 1 and 2, and detailed descriptions thereof will be omitted.

In the speed reduction apparatus 110, a fan hood 150 having a shape different from that of the fan hood 50 is attached to a non-load side end portion of the casing 30.

Similar to the fan hood 50, the fan hood 150 includes a trumpet-like portion 152 having an inner surface that is separated away from the input shaft toward the load side. A first cylindrical portion 154 extending in parallel with the input shaft is connected to the non-load side of the trumpet-like portion 152. A second cylindrical portion 156 similarly extending in parallel with the input shaft is connected to the load side of the trumpet-like portion.

An inclined portion 151 inclined toward the protruding portion 12 of the input shaft is connected to the non-load side of the first cylindrical portion 154. A non-load side opening portion 153 is formed on the inner diameter side of the inclined portion 151. A load side opening portion 158 is formed on the load side of the fan hood 150. In the embodiment, a gap of approximately 20 mm to approximately 50 mm is formed between the load side opening portion 158 and the external surface of the casing 30. When the fan 40 is rotated, air is suctioned into the fan hood 150 through the non-load side opening portion 153 of the fan hood 150, and airstreams are blown to the load side of the speed reduction apparatus 110 from the load side opening portion 158.

More specifically, the trumpet-like portion 152 of the fan hood 150 is configured to include a diameter increasing portion 152a having an inner surface inclined to be separated away from the input shaft toward the load side, and a flat portion 152b having an inner surface parallel to the input shaft. A pair of the diameter increasing portions 152a is respectively provided on the upper and lower surface sides of the casing 30. A pair of the right and left flat portions 152b is provided to connect the diameter increasing portions 152a on the upper surface side to the diameter increasing portion 152a on the lower surface side. The flat portion 152b forms a continuous surface which is continuous with side surfaces of the first cylindrical portion 154 and the second cylindrical portion 156. As a result, in such a structure, the axis perpendicular section of the trumpet-like portion 152 has an octagonal shape.

It is possible to reduce the length of time that airstreams generated by the fan 40 spend at the four corners of the fan hood, and to blow parallel airstreams along the external surface of the casing 30 from the load side opening portion 158 of the fan hood 150 by forming the section of the trumpet-like portion 152 into an octagonal shape close to a circular shape, compared to a case where the trumpet-like portion has a rectangular section.

Figure 7:
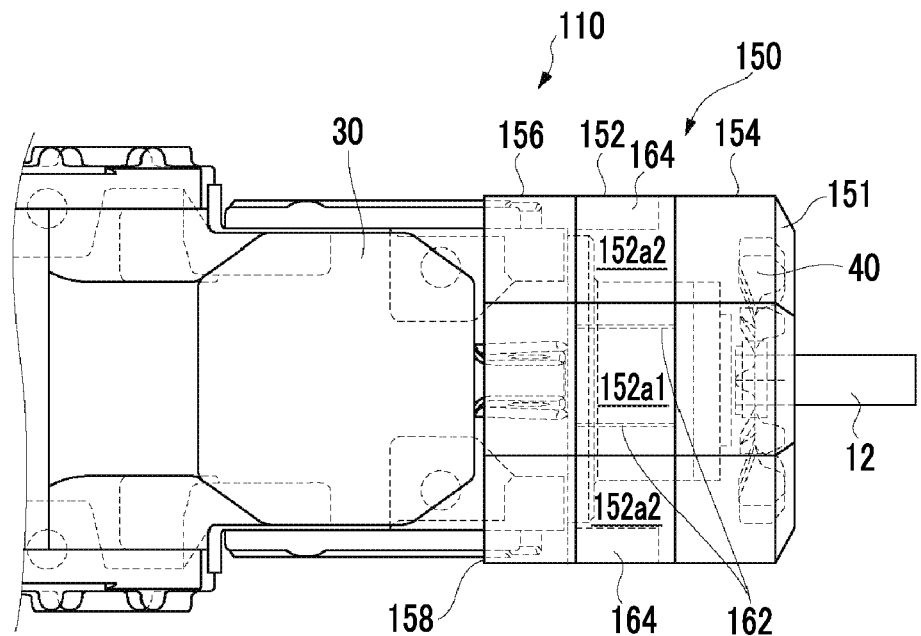
FIG. 7 is a top view illustrating the input shaft side of the speed reduction apparatus in FIG. 5.
Figure 8:
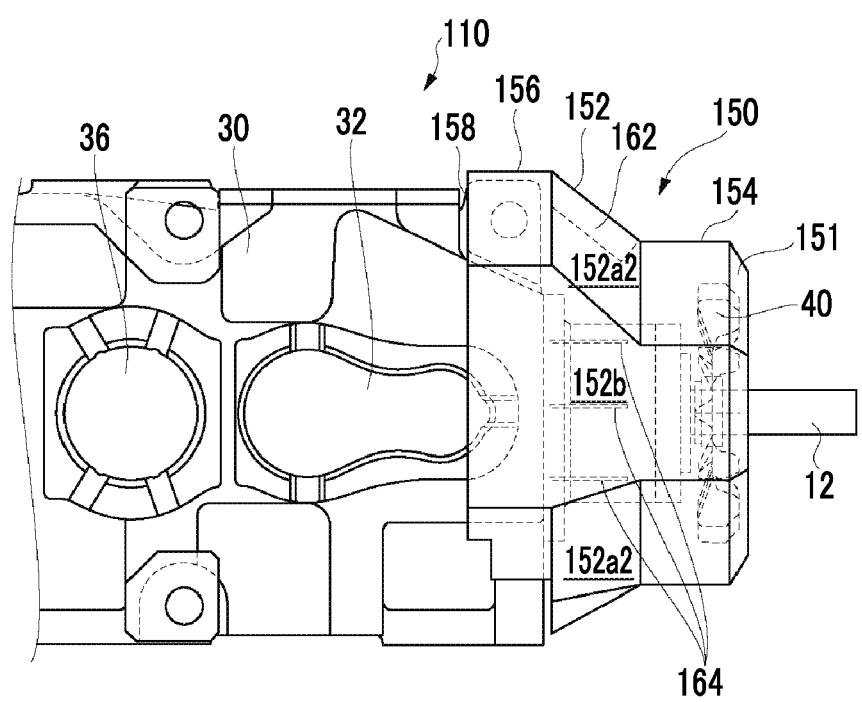
FIG. 8 is a front view illustrating the input shaft side of the speed reduction apparatus in FIG. 5.

FIGS. 7 and 8, respectively, are a top view and a front view illustrating the non-load side of the speed reduction apparatus 110. In FIGS. 7 and 8, a structure hidden by the fan hood 150 is illustrated by the dotted line.

As illustrated in the drawings, the diameter increasing portion 152a of the trumpet-like portion 152 includes a central diameter increasing portion 152a1, and right and left diameter increasing portions 152a2 which are respectively positioned on the right and left sides of the central diameter increasing portion 152a1. A flow straightening fin 162 is provided on an inner surface of the central diameter increasing portion 152a1 on the upper surface side. In the embodiment, two flow straightening fins 162 are provided; however, different numbers of flow straightening fins 162 may be provided. Flow straightening fins are not provided on an inner surface of each of the right and left diameter increasing portions 152a2 on the upper surface side. Flow straightening fins are also not provided on an inner surface of any one of the central diameter increasing portion 152a1, and the right and left diameter increasing portion 152a2 on the lower surface side.

The flow of airstreams generated by the fan 40 is straightened, and parallel airstreams are formed along the exterior surface of the casing 30 by providing the flow straightening fins on the inner surface of the fan hood 150.

Flow straightening fins 164 may also be provided on inner surfaces of the pair of the flat portions 152b of the trumpet-like portion 152, along with providing the flow straightening fins 162 on the inner surface of the central diameter increasing portion 152a1 of the trumpet-like portion 152. In the embodiment, three flow straightening fins 164 are provided on each of the pair of the right and left flat portions 152b; however, different numbers of flow straightening fins 164 may be provided. Each of the flow straightening fins 162 may have an axial length greater than that of each of the flow straightening fins 164. In this way, flow straightening effects are further improved.

Unlike the fan hood 50, in the fan hood 150, flow straightening fins are not provided on an inner surface of the second cylindrical portion 156. The reason for this is that sufficient flow straightening effects can be obtained by the flow straightening fins 164 provided on the inner surfaces of the pair of the flat portions 152b of the trumpet-like portion 152. The flow straightening fins 162 and the flow straightening fins 164 do not overlap the fan 40 when seen in the radial direction.

Hereinafter, the operation of the speed reduction apparatus 110 will be described.

When the motor shaft of the motor (not illustrated) rotates, the input shaft coupled to the motor shaft is rotated. When the input shaft is rotated, the first intermediate shaft 32, the second intermediate shaft 36, and the output shaft 38 are rotated by meshing of the gears while the speed is reduced. The rotation of these shafts is transmitted to the non-driven machine (not illustrated). The fan 40 attached to the protruding portion 12 of the input shaft is rotated, and air is suctioned into the fan hood 150 through the non-load side opening portion 153 of the fan hood 150. The suctioned air is fed as airstreams to the radial outside by the rotation of the fan 40. The direction of the fed airstreams is changed by the first cylindrical portion 154, the trumpet-like portion 152, and the second cylindrical portion 156 of the fan hood 150. The flow of the airstreams is straightened by the flow straightening fins 162 and the flow straightening fins 164 provided on the inner surfaces of the trumpet-like portion

152. Due to flow straightening effects, airstreams flowing out from the load side opening portion 158 of the fan hood 150 are directed to flow substantially parallel with the exterior surface of the casing 30. Accordingly, cooling effects for the vicinity of the casing 30 accommodating the input shaft, the first intermediate shaft 32, and the bevel gear meshing the input shaft with the first intermediate shaft 32, which have the highest rotational speed and a high thermal load, are particularly improved. Cooling effects for the second intermediate shaft 36 are also improved by parallel airstreams.

Several embodiments of the present invention have been described. The embodiments are exemplarily given. As examples, a combination of the configuration elements of the embodiments can be modified, and persons skilled in the art understand that the scope of the present invention includes the modification examples.

In the embodiment, a perpendicular-shaft speed reduction apparatus is described as an example. The invention can be applied to other power transmission apparatuses including a parallel-shaft speed reduction apparatus and the like insofar as the other power transmission apparatuses are configured such that a fan is provided on a protruding portion of an input shaft which protrudes from a casing.

The number or disposition of flow straightening fins is not limited to the examples described in the embodiments. The number of flow straightening fins provided on the inner surface of the trumpet-like portion may be one, or three or more. Flow straightening fins may be provided on the inner surfaces of the right and left diameter increasing portions 52*a*2 of the trumpet-like portion 52, or on the inner surfaces of the right and left diameter increasing portions 152*a*2 of the trumpet-like portion 152.

The sectional shape of the fan hood is not limited to an octagonal shape. The sectional shape may be a polygonal shape, a circular shape, and the like other than an octagonal shape.

It should be understood that the invention is not limited to the above-described embodiment, but may be modified into various forms on the basis of the spirit of the present invention. Additionally, the modifications are included in the scope of the present invention.

What is claimed is:

1. A speed reduction apparatus comprising:
   a casing that accommodates a speed reduction mechanism;
   an input shaft including a protruding portion protruding from the casing to the outside;
   a fan provided on the protruding portion of the input shaft; and
   a fan hood that covers the fan,
   wherein the fan hood includes a cylindrical portion, and a trumpet-like portion that is connected to the cylindrical portion, and includes a plurality of inner surfaces inclined to be separated away from the input shaft toward a load side, and at least one of a plurality of flow straightening fins is provided on at least one of the plurality of inner surfaces of the trumpet-like portion,
   wherein the speed reduction apparatus is used in a state where a lower surface of the casing is mounted on a floor or the like,
   wherein the trumpet-like portion includes a plurality of diameter increasing portions having at least one of the plurality of inner surfaces inclined to be separated away from the input shaft toward the load side, and a pair of flat portions having at least one of the plurality of inner surfaces parallel to the input shaft,
   wherein the trumpet-like portion includes a pair of the diameter increasing portions respectively provided on an upper surface side and a lower surface side of the casing,
   wherein the trumpet-like portion pair of flat portions are provided to connect the diameter increasing portions on the upper surface side to the diameter increasing portion on the lower surface side, and
   wherein the plurality of flow straightening fins are provided on an the at least one of the plurality of inner surfaces of each of the diameter increasing portion on the upper surface side, and the plurality of flow straightening fins are not provided on the at least one of the plurality of inner surfaces of the diameter increasing portion on the lower surface side.

2. The speed reduction apparatus according to claim 1, wherein the plurality of flow straightening fins are not provided on an inner surface of the cylindrical portion.

3. The speed reduction apparatus according to claim 1, wherein at least a portion of all of the plurality of flow straightening fins provided on the plurality of inner surfaces of the trumpet-like portion overlap each other in a circumferential direction.

4. The speed reduction apparatus according to claim 1, wherein at least one of a plurality of second flow straightening fins is provided on an inner surface of the cylindrical portion connected to the pair of flat portions.

5. The speed reduction apparatus according to claim 4, wherein the at least one of the plurality of second flow straightening fins is disposed across both the cylindrical portion and the pair of flat portions.

6. The speed reduction apparatus according to claim 5, wherein the plurality of flow straightening fins and the plurality of second flow straightening fins at least partially overlap in a circumferential direction.

7. The speed reduction apparatus according to claim 1, wherein the plurality of flow straightening fins and the fan do not overlap each other when seen in a radial direction.

8. The speed reduction apparatus according to claim 1, wherein the cylindrical portion includes a first cylindrical portion connected to a non-load side of the trumpet-like portion, and a second cylindrical portion connected to a load side of the trumpet-like portion.

9. The speed reduction apparatus according to claim 1, wherein the upper side diameter increasing portion includes a central diameter increasing portion, and right and left diameter increasing portions which are respectively positioned on the right and left sides of the central diameter increasing portion, and the at least one of the plurality of flow straightening fins is provided on the at least one of the plurality of inner surfaces of the central diameter increasing portion.

10. The speed reduction apparatus according to claim 9, wherein at least one of a plurality of second flow straightening fins is provided on each of the at least one of the plurality of inner surfaces of the pair of flat portions, and the plurality of flow straightening fins have an axial length greater than the plurality of second flow straightening fins.

11. The speed reduction apparatus according to claim 1, wherein the cylindrical portion includes a cutout through which a hanging tool is exposed.

12. The speed reduction apparatus according to claim 1, wherein the fan hood includes a load side opening portion that is an opening formed on the load side, and a gap of 20 mm to 50 mm is formed between the load side opening portion and an external surface of the casing.

13. The speed reduction apparatus according to claim 1, further comprising an output shaft,
wherein a first intermediate shaft and a second intermediate shaft are provided between the input shaft and the output shaft.

* * * * *